No. 670,594. Patented Mar. 26, 1901.
W. M. McCARTNEY.
PROFILE INSTRUMENT.
(Application filed Nov. 10, 1900.)
(No Model.) 2 Sheets—Sheet 1.
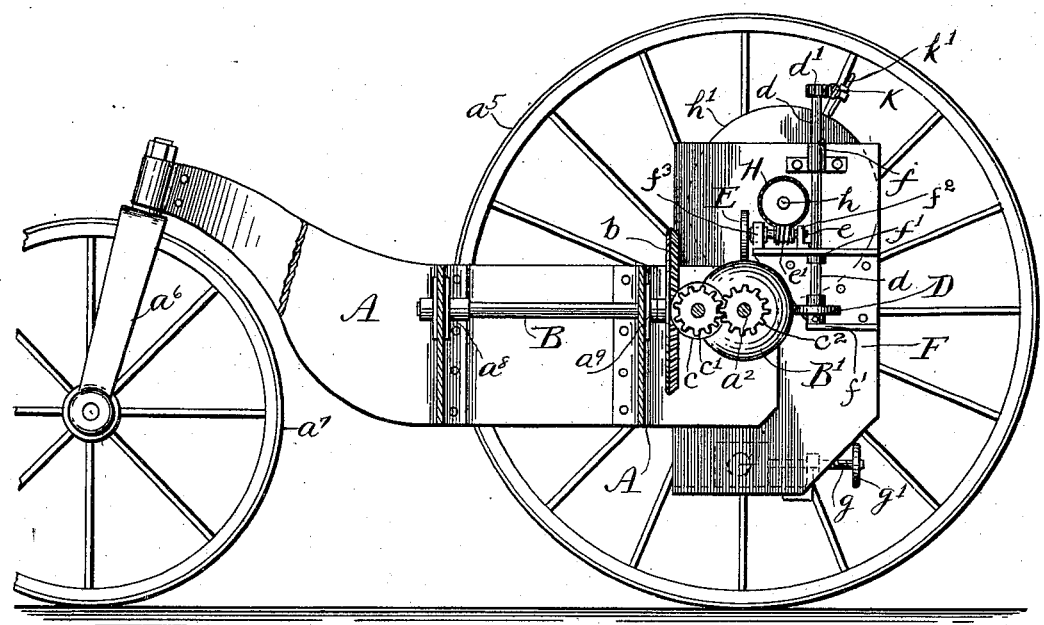
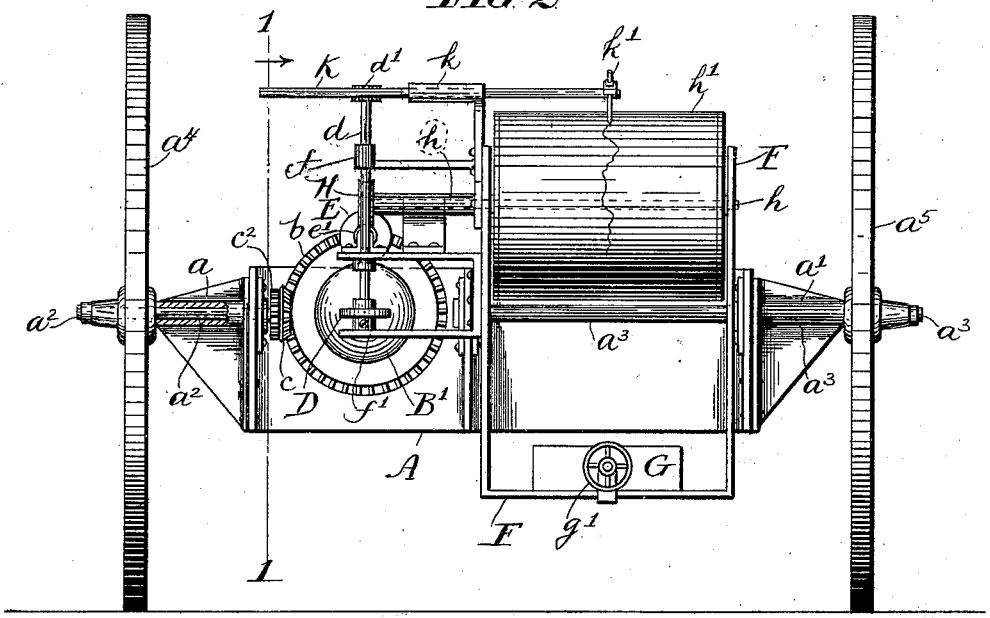
Witnesses:
Chas. O. Shervey
S. Bliss
Inventor:
William M. McCartney
By Wilkinson & Fisher
his Atty's No. 670,594. Patented Mar. 26, 1901.
W. M. McCARTNEY.
PROFILE INSTRUMENT.
(Application filed Nov. 10, 1900.)
(No Model.) 2 Sheets—Sheet 2.
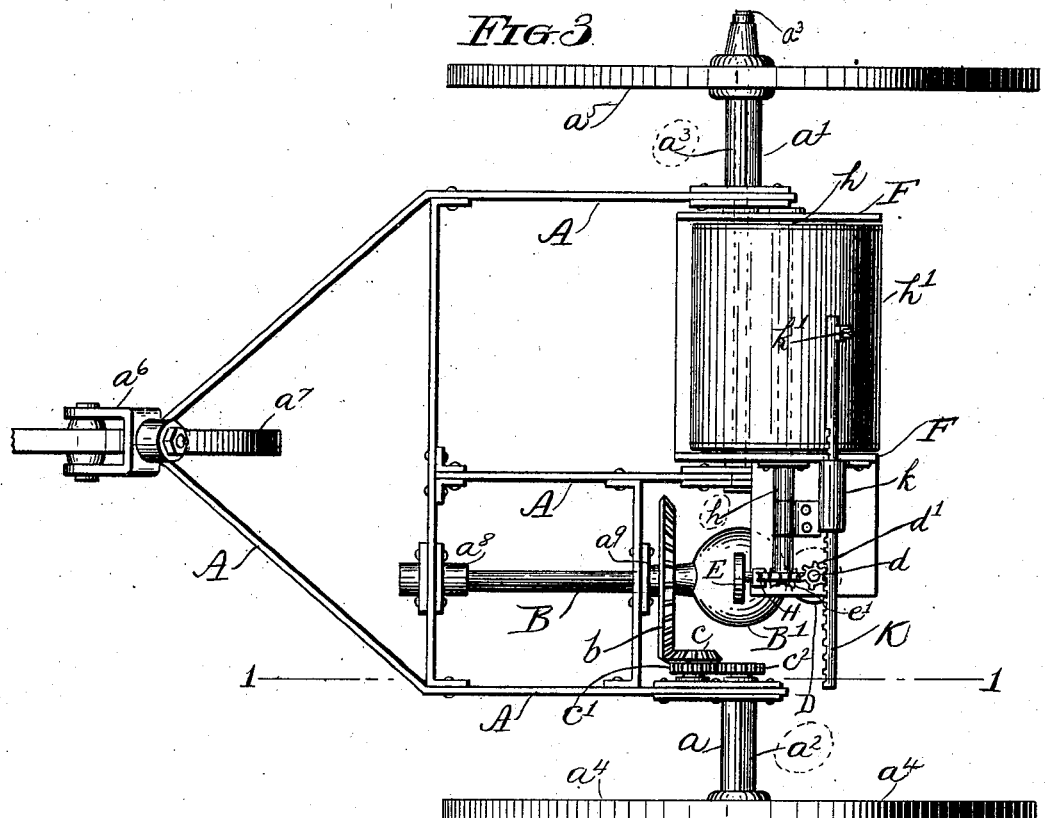
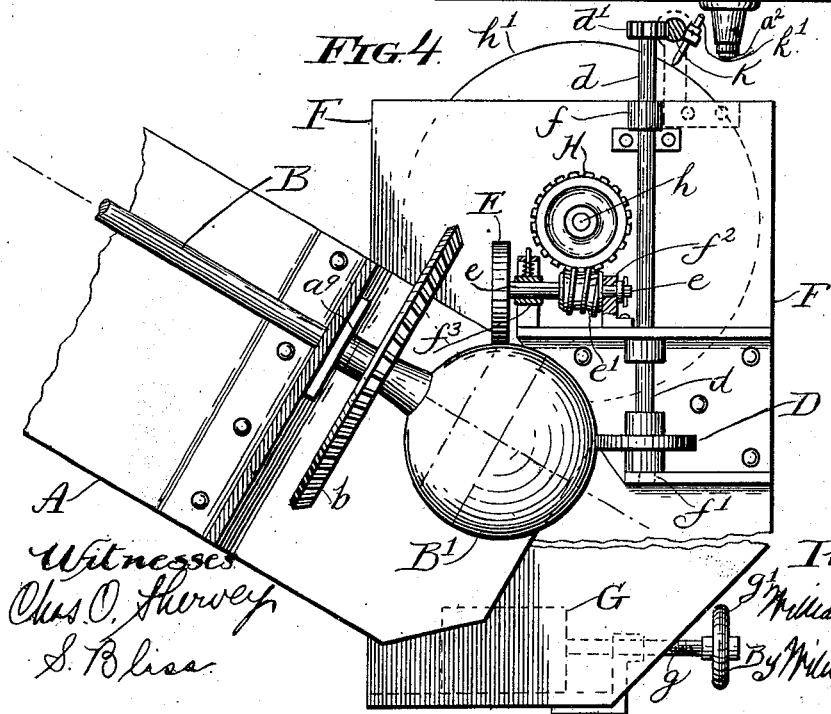
Witnesses
Chas. O. Harvey
S. Bliss
Inventor
William M. McCartney
By Wilkinson & Fisher
his Attys

UNITED STATES PATENT OFFICE.

WILLIAM M. McCARTNEY, OF CHICAGO, ILLINOIS.

PROFILE INSTRUMENT.

SPECIFICATION forming part of Letters Patent No. 670,594, dated March 26, 1901.

Application filed November 10, 1900. Serial No. 36,060. (No model.)

*To all whom it may concern:*

Be it known that I, WILLIAM M. MCCARTNEY, a citizen of the United States of America, residing at Chicago, in the county of Cook and State of Illinois, have invented certain new and useful Improvements in Profile Instruments, of which the following is a specification.

My invention relates to a certain new and improved profile instrument intended to automatically and graphically record the profile of the surface over which the instrument passes.

The object of the invention is to provide an apparatus which may be run over any surface, as a road or other line, of which a profile is desired, and which shall in the course of its movement along said surface automatically record upon a suitable surface provided therefor the profile of the surface in proper relation to a suitable base-line, accurately locating each point in the profile above the corresponding point in the base-line.

To such end the invention consists in certain novel devices and combinations thereof, which will be fully described in this specification and the essential features of which will be pointed out in the appended claims.

In the drawings, Figure 1 is a longitudinal vertical section of a complete machine in line 1 1 of Fig. 3. Fig. 2 is a rear elevation of said machine; Fig. 3, a plan of the same, and Fig. 4 an enlarged longitudinal vertical section in the same plane as Fig. 1 and broken away at certain points.

Referring to the drawings, A is a framework, preferably of open construction and providing journals $a\ a'$ for axles $a^2\ a^3$, preferably in the same line and bearing opposite supporting-wheels $a^4\ a^5$. In the end of the frame is pivoted a fork $a^6$, in which is journaled a wheel $a^7$, completing the supporting-wheels of the frame. In the frame is journaled a horizontal shaft B, Fig. 3, by means of the bearings $a^8\ a^9$, said shaft bearing a bevel-gear $b$, in mesh with a bevel-pinion $c$, fast to a spur-gear $c'$, suitably journaled in the frame and in mesh with a spur-gear $c^2$ on the axle $a^2$. On the end of the shaft B, beyond the bevel-gear, is a sphere B', upon the surface of which run two friction-rollers D E, Fig. 4. The friction-roller D is fast on a shaft $d$, journaled in bearings $f f'$ on a swinging frame F, pivoted upon the axle $a^3$. (See also Fig. 2.) Said swinging frame also supports journals $f^2\ f^3$, in which is a shaft $e$, carrying the friction-wheel E. A weight G, adjustable longitudinally of the apparatus by means of a screw $g$ and hand-wheel $g'$, furnishes means for balancing the swinging frame upon the axle and maintaining it in a vertical position.

The shafts B $d\ e$ are in the same plane and the shafts $d\ e$ are at right angles to each other. The friction-wheels D E are arranged just a quarter of the circumference of the sphere apart. When the supporting-wheels rest upon a horizontal surface, at which time the shaft B is horizontal, the friction-wheel D rests upon the pole of the sphere and the wheel E upon the equator. On the shaft $e$ is a worm $e'$, Fig. 4, in mesh with a gear H on a shaft $h$, journaled in the frame F and carrying a drum $h'$, upon which paper may be stretched, or other suitable surface provided to receive the automatic record of the device. Upon the upper end of the shaft $d$ is a pinion $d'$, in mesh with a rack K, guided longitudinally in a sleeve $k$, supported by the swinging frame, said rack extending alongside of the surface of the cylinder and bearing a recording-pencil $k'$ in contact with said surface. By means of this gearing the friction-wheel E rotates the drum and the friction-wheel D moves the pencil longitudinally thereof.

Inasmuch as the instrument runs upon the surface of the profile, the movement of the pencil should be proportional to the sine of the angle of elevation and the movement of the drum should be proportional to the cosine thereof. The sphere B' and the friction-wheels E D give to these parts movement in exactly the proportion desired, and the passage of the friction-wheel D from one side to the other of the pole reverses the movement of said wheel, and consequently of the pencil, and in this way automatically records depressions as well as elevations. This particular friction-gearing is peculiarly adapted to the purposes of this invention, but is not itself claimed herein, inasmuch as it is made the subject of a separate application filed of even date herewith.

In the operation of the device the pencil is set at some point intermediate between the two ends of the cylinder, depending possibly upon the prospective nature of the ground to be traversed, and the machine is then passed at moderate speed over the line of which the profile is to be made. If the surface happens to be horizontal, the friction-wheel D will rest upon the pole of the sphere, where it will receive no motion from said sphere and the friction-wheel E will run upon the equator, where it will receive the maximum motion. In other words, as long as the surface is level it is parallel with the base-line, and the cylinder is rotated at a speed proportionate to the rotation of the supporting-wheel $a^4$. If, however, the forward wheel $a^7$ of the machine be raised by any elevation in the ground, the sphere will be tilted—as, for instance, as seen in Fig. 4. The length of the circle traversed by the wheel E will be reduced and the wheel D will pass from the pole so as to traverse a small circle about the latter. The motion of the wheel D causes the pencil to move upward on the cylinder, recording the elevation. The wheel E causes the cylinder to revolve more slowly in proportion to the supporting-wheels and in constant ratio to the base-line or cosine of the angle of elevation.

I recognize the possibility of considerable variation in form and arrangement, and therefore do not limit my invention to the specific details herein set forth.

I claim as new and desire to secure by Letters Patent—

1. The combination with a main frame provided with supporting-wheels, of a swinging frame supported in said main frame and provided with means for maintaining it in a given position with reference to a vertical line, a movable recording-surface, variable gearing between said recording-surface and one of the supporting-wheels, a movable recording device adapted to make a record upon said surface, variable gearing between said recording device and one of the supporting-wheels, and suitable means whereby the oscillation of the swinging frame upon the main frame causes a predetermined variation in the gearing, both between the recording-surface and the supporting-wheel, and between the recording device and the supporting-wheel; substantially as described.

2. In a device of the class described, the combination with a main frame, supporting-wheels therefor, and a swinging frame supported in said main frame and provided with means for maintaining it in a given position with reference to a vertical line, of a suitably-supported recording-surface, a recording device, a sphere located with its center in the axis of oscillation of the swinging frame and geared to one of the supporting-wheels of the main frame, a friction-wheel supported by the swinging frame, geared to move the recording-surface and arranged upon the equator of the sphere when the machine rests on a horizontal surface and a second friction-wheel also supported by the swinging frame, geared to the recording device and arranged upon the pole of the sphere when the machine rests upon a horizontal surface; substantially as described.

3. The combination with a main frame having suitable supporting-wheels, of a swinging frame hung therein, and provided with means for maintaining it in a vertical position without reference to the position of the main frame, a cylinder having a suitable recording-surface rotatably mounted in said swinging frame, a recording device supported and guided so as to move longitudinally upon the surface of the cylinder, a sphere located with its center in the axis of oscillation of the swinging frame and journaled in the main frame, suitable gearing between the sphere and one of the supporting-wheels to rotate the sphere in a given ratio to the surface traversed, a friction-wheel supported by the swinging frame, geared to the cylinder and arranged upon the equator of the sphere, when the machine is in a horizontal position, and a second friction-wheel geared to the recording device and arranged upon the pole of the sphere when the machine is in the same position; substantially as described.

4. In a device of the class described, the combination with a main frame, supporting-wheels therefor, and a swinging frame pivoted therein and weighted to keep it in a given position with reference to a vertical line, of a suitably-mounted movable device adapted to receive a record, a suitably-mounted movable recording device adapted to make a record thereon, variable gearing between the record-receiving device and one of the supporting-wheels, varied by the oscillation of the swinging frame in the main frame and variable gearing between the record-making device and one of the supporting-wheels, also varied by the oscillation of the swinging frame in the the main frame, whereby both the record-receiving device and the record-making device may be moved by the passage of the supporting-wheels over the ground and the ratio of movement of the record-receiving device to that of the supporting-wheels, and also the ratio movement of the record-making device to that of the supporting-wheels may be governed by the angular position of the swinging frame in the main frame; substantially as described.

In witness whereof I have hereunto set my hand, at Chicago, in the county of Cook and State of Illinois, this 6th day of November, A. D. 1900.

WILLIAM M. McCARTNEY.

Witnesses:
CHAS. O. SHERVEY,
S. BLISS.